US008564610B2

(12) United States Patent
Nagashima

(10) Patent No.: US 8,564,610 B2
(45) Date of Patent: Oct. 22, 2013

(54) IN-VEHICLE DEVICE

(75) Inventor: Takanobu Nagashima, Tokyo (JP)

(73) Assignee: Clarion Co., Ltd., Tokyo (JP)

(*) Notice: Subject to any disclaimer, the term of this patent is extended or adjusted under 35 U.S.C. 154(b) by 108 days.

(21) Appl. No.: 13/142,369

(22) PCT Filed: Aug. 20, 2009

(86) PCT No.: PCT/JP2009/064581
§ 371 (c)(1),
(2), (4) Date: Jun. 27, 2011

(87) PCT Pub. No.: WO2011/021294
PCT Pub. Date: Feb. 24, 2011

(65) Prior Publication Data
US 2011/0267364 A1 Nov. 3, 2011

(51) Int. Cl.
*G09G 5/02* (2006.01)
(52) U.S. Cl.
USPC ........... 345/592; 345/593; 345/619; 345/629; 345/639; 345/440; 345/440.1; 345/440.2; 715/764; 715/771; 715/772
(58) Field of Classification Search
None
See application file for complete search history.

(56) References Cited

U.S. PATENT DOCUMENTS

| 8,072,472 B2* | 12/2011 | Hunt ............................. 345/660 |
| 2007/0132572 A1 | 6/2007 | Itoh et al. |
| 2008/0144905 A1* | 6/2008 | Tallman ........................ 382/131 |

FOREIGN PATENT DOCUMENTS

| JP | 8-240447 | 9/1996 |
| JP | 11-245687 | 9/1999 |
| JP | 2007-526161 | 9/2007 |
| JP | 2009-103477 | 5/2009 |

OTHER PUBLICATIONS

International Search Report dated Nov. 17, 2009 issued in PCT/JP2009/064581.

* cited by examiner

*Primary Examiner* — Antonio A Caschera
(74) *Attorney, Agent, or Firm* — Scully, Scott, Murphy & Presser, PC

(57) ABSTRACT

An in-vehicle device for displaying a meter image in real time, wherein the processing load is reduced without deterioration of the appearance of the meter image. The in-vehicle device stores therein a plurality of basic images which can indicate a first measured value and a second measured value both of which are measured values relating to the vehicle. According to the acquired first and second measured values, the in-vehicle device selects a predetermined basic image out of the plurality of basic images, transmits a partial area of the selected basic image, and synthesizes these basic images, to thereby generate a meter image to be displayed.

6 Claims, 7 Drawing Sheets

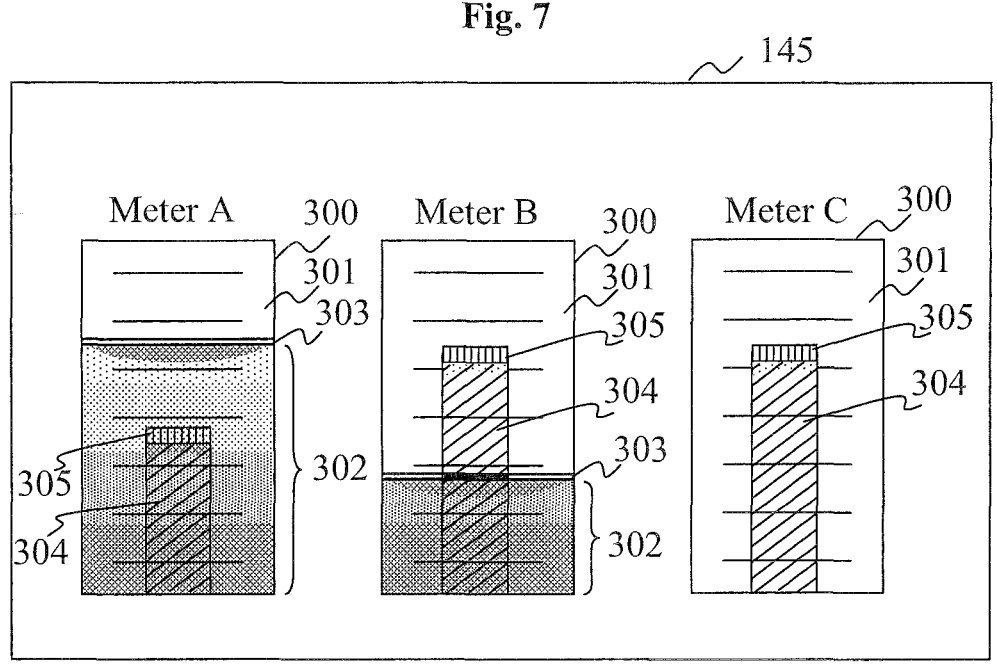

IN-VEHICLE DEVICE

CROSS REFERENCE TO RELATED APPLICATION

This application claims benefit of priority to PCT Application No. PCT/JP2009/064581 filed on Aug. 20, 2009, the entire contents of which is incorporated herein by reference.

TECHNICAL FIELD

The present invention relates to an in-vehicle device.

BACKGROUND ART

Patent Document 1 discloses a technique of displaying a specific measured value on a screen of an image display unit provided in an in-vehicle device. Such an in-vehicle device generates a meter image by superimposing an image of an indicating needle (which indicates a measured value acquired through a sensor) upon an image imitating a dial of a mechanical meter, and displays the generated meter image on the image display unit. Then, to display the measured value in real time, the in-vehicle device repeats the rendering processing.

Japanese Un-examined Patent Application Laid-Open No. 8-240447

Henceforth, it is considered to decorate a meter image variously from the viewpoint of visibility and aesthetic appreciation. For example, it is possible to make a meter image look more attractive by superimposing a semi-transmissive graph (for example, a bar graph) indicating a measured value against the background of a dial. However, generation of a complex image for each change of a measured value entails a higher processing load for an in-vehicle device having a smaller memory capacity and a limited processing speed.

Thus, an object of the present invention is to provide an in-vehicle device that can attractively and efficiently display an image for indicating a measured value relating to a vehicle.

DISCLOSURE OF THE INVENTION

To solve the above problems, the present invention provides an in-vehicle device comprising:

a measured value acquisition means, which acquires measured values concerning a vehicle as first and second measured values;

an image storage means, which stores kinds of basic images that can be used for displaying the first and second measured values;

an image generation means, which generates an image for display use by combining basic images while transparentizing some areas of given basic images among the kinds of basic images, depending on the first and second measured values acquired by the measured value acquisition means; and an image display means, which displays the image for display use generated by the image generation means.

The image storage means may store: a basic image showing a case where each of the first and second measured values acquired by the measured value acquisition means are the maximum; and a basic image showing a case where the first and second measured values acquired by the measure value acquisition means are the minimum.

The image storage means may store a basic image showing a case where the first measured value acquired by the measured value acquisition means is the minimum, and the second measured value acquired by the measured value acquisition means is the maximum.

The image storage means may store: a first basic image showing the case where the first and second measured values both are the minimum; a second basic image showing the case where the first measured value is the minimum and the second measured value is the maximum; a third basic image showing a case where the first measured values is the maximum and the second measured value is the minimum; and a fourth basic image showing the case where the first and second measured values both are the maximum. And, the image generation means may use: the first, third and fourth basic images for creating the image for display use, when the first measured value is larger than the second measured value; and the first, second and fourth basic images for creating the image for display use, when the first measured value is not larger than the second measured value.

The image generation means may transparentize some parts of the first, third and fourth basic images so that an area corresponding to values larger than the first measured value in the first basic image, an area corresponding to values between the first measured value and the second measured value in the third basic image and an area corresponding to values smaller than the second measured value in the fourth basic image appear in the image for display use, when the first measured value is larger than the second measured value; and transparentize some parts of the first, second and fourth basic images so that an area corresponding to values larger than the first measured value in the first basic image, an area corresponding to values between the first measured value and the second measured value in the second basic image and an area corresponding to values smaller than the second measured value in the fourth basic image appear in the image for display use, when the first measured value is not larger than the second measured value.

The basic images may be images to which gradation is applied, images displaying a bar graph of a uniform color, or images including an image to which gradation is applied and a bar graph of a uniform color.

According to the present invention, it is possible to display an image in which a semi-transparent graph, decorations and the like are depicted against the background in order to notify the user of measured values, without executing the process of overlapping a semi-transparent image on another image.

BRIEF DESCRIPTION OF DRAWINGS

FIG. 7 is a view showing an example of meter image display.

BEST MODE FOR CARRYING OUT THE INVENTION

Figure 1:
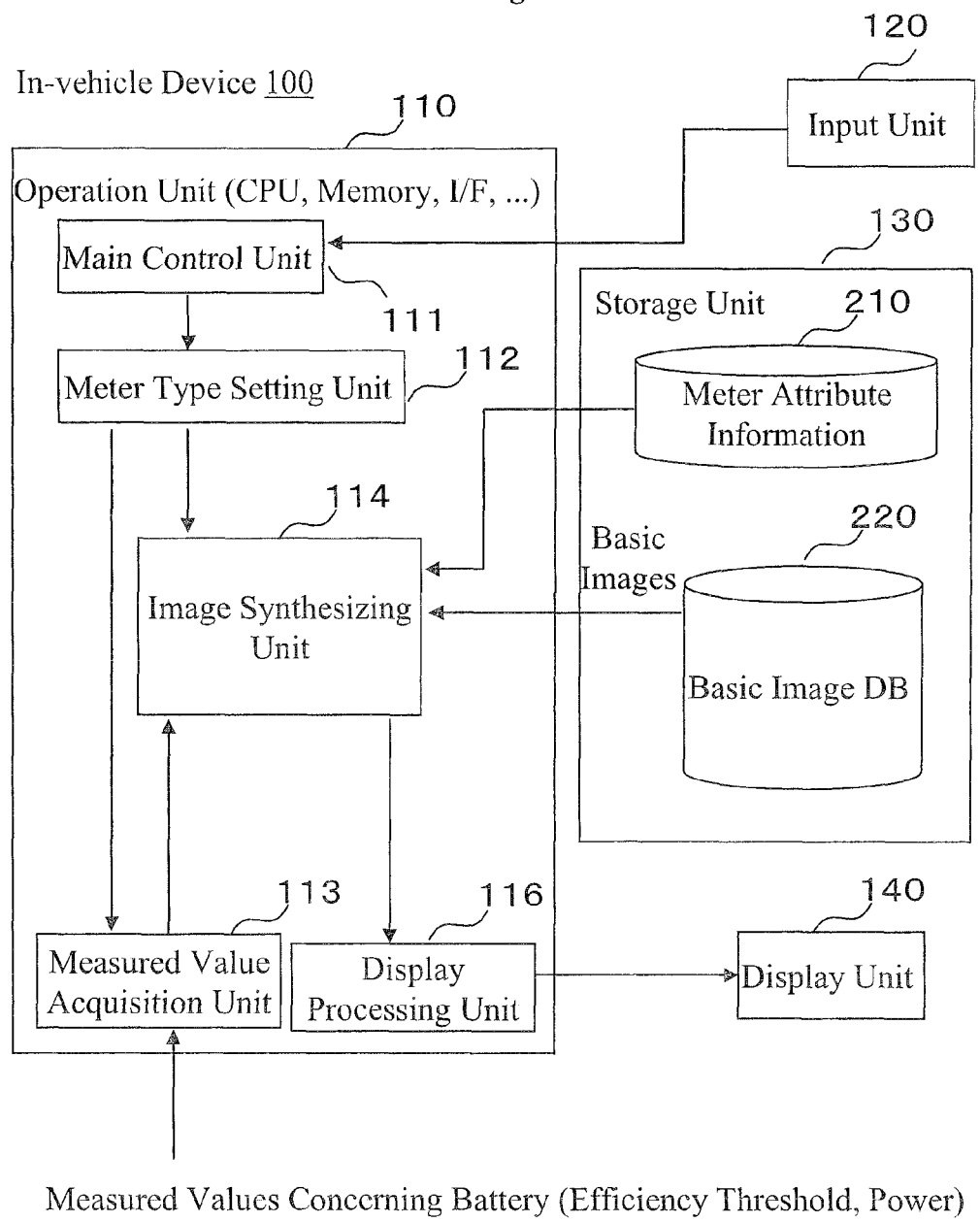
FIG. 1 is a schematic block diagram showing an in-vehicle device according to an embodiment of the present invention.

Now, an embodiment of the present invention will be described referring to the drawings.

First, an outline of a meter image displayed on an in-vehicle device of the present embodiment will be described. As shown in FIG. 7, the in-vehicle device of the present embodiment displays two measured values (values to be outputted) at the same time by a meter image 300 that includes two bar graphs 302 and 304. The larger the measured value to be displayed is, the more the length of each bar graph 302, 304 grows from the lower end of a dial 301 toward the upper end.

Further, the in-vehicle device displays the bar graphs 302 and 304 such that the first bar graph 302 appears to be superimposed upon the second bar graph 304.

FIG. 1 is a schematic block diagram showing an in-vehicle device 100 according to an embodiment of the present invention.

As shown in FIG. 1, the in-vehicle device 100 comprises an operation unit 110; an input unit 120, a storage unit 130 and a display unit 140.

The input unit 120 is a device for receiving a request from a user, and is comprised of a keyboard, hard switches, a touch panel, or the like.

The display unit 140 is a device for outputting, in the form of an image, information to be displayed to a user, and is comprised of a liquid crystal display unit, an organic EL display unit, or the like.

The storage unit 130 is a device for storing various kinds of information used in the in-vehicle device 100. The storage unit 130 can be comprised of a nonvolatile memory. The storage unit 130 previously stores meter attribute information 210, a basic image database (DB) 220, and the like in addition to a program indicated by the flowchart of FIG. 4.

The meter attribute information 210 includes information on attributes of meters.

Figure 2:
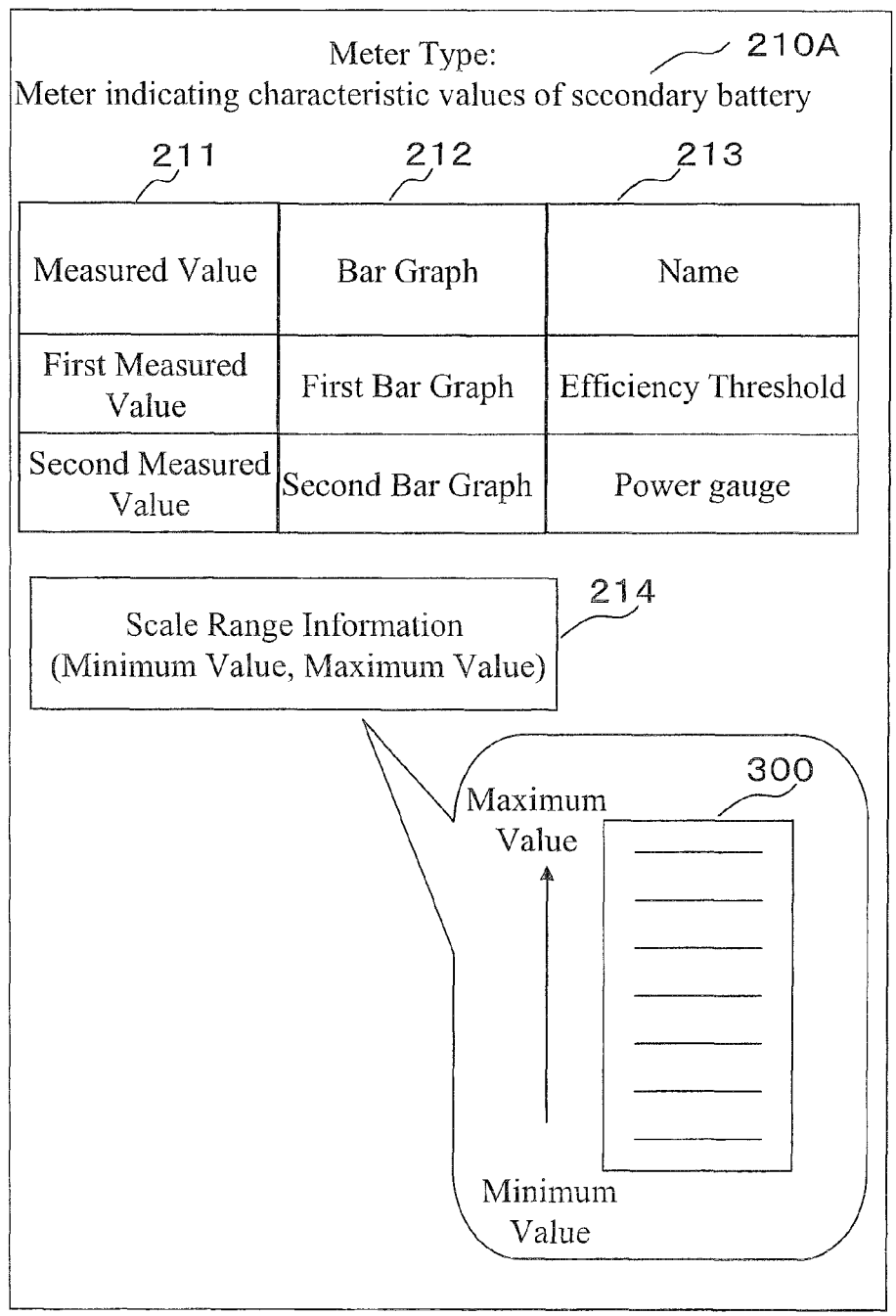
FIG. 2 is a diagram showing a configuration of meter attribute information.

FIG. 2 is a diagram showing an example of configuration of the meter attribute information 210.

For each meter type 210A, the meter attribute information 210 stores a type of measured value 211, a type of bar graph 212 and a name 213 associated with the meter type 210A.

An example of a meter type 210A is a "meter indicating characteristic values of secondary battery". By this meter, the in-vehicle device 100 displays an efficiency threshold and regenerative power as characteristic values of a secondary battery.

In the "meter indicating characteristic values of secondary battery", a first measured value is a value (hereinafter, referred to as efficiency threshold) at which the fuel efficiency of the hybrid vehicle mounting the in-vehicle device 100 becomes best, and is displayed by a first bar graph to which gradation is applied. A second measured value is regenerative power i.e. electric power that has been generated at braking and charged to the second battery mounted in the vehicle, and is displayed by a second bar graph of a uniform color (for example, black). As shown in FIG. 7, the first bar graph 302 is displayed in the manner it is being overlapped upon the second bar graph 304, although the first bar graph 302 is expressed translucently so that the second bar graph 304 is visible.

The in-vehicle device 100 displays a meter image 200 for informing a driver of the first and second measured values that vary depending on conditions of the moment, in order to assist the driver in driving the hybrid vehicle on which the in-vehicle device 100 is mounted so that the driver can do fuel-efficient driving. In detail, as the first measured value, an amount and period of pressing a foot brake for minimizing dissipation of regenerative power are used, and as the second measured value, the actual regenerative power is applied, and these measured values are displayed simultaneously. Seeing these measured values, the user can judge whether his driving is efficient or not. Thus, it is expected that the user will think of driving to minimize the gap between the first measured value and the second measured value.

Here, it is possible to use the rechargeable capacity of the secondary battery as the first measured value and the actual regenerative power as the second measured value.

Of course, kinds of a meter and measured values as the objects of display are not limited to these.

Further, the meter attribute information 210 stores a scale range (the minimum and maximum values) 214. The minimum and maximum values of the scale range 214 are values that become respectively the minimum and the maximum on the scale in the meter image 300.

Although the two measured values are displayed on the common scale in the present embodiment, this is not necessary. Scales different from each other can be set respectively for these measured values.

The basic image DB 220 includes basic image data that are used for generating a meter image 300.

Figure 3:
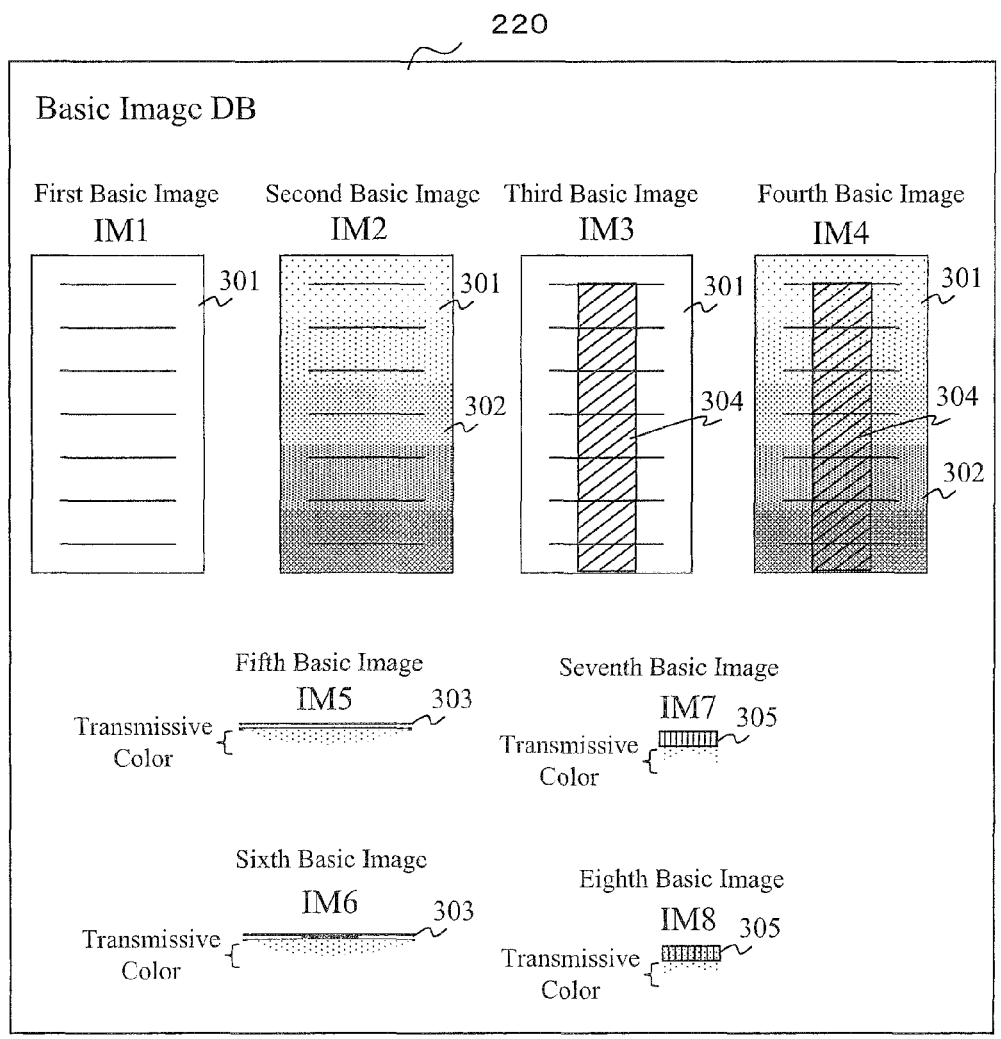
FIG. 3 is a diagram showing a configuration of basic image DB.

FIG. 3 shows a configuration of basic images stored in the basic image DB 220. Here, these basic images are, so to speak, component parts of a whole screen, and are used as files conforming to the format of Portable Network Graphics. In detail, the basic images in the present embodiment conform to the format of PNG-8 having perfectly-transmissive data and perfectly-opaque data. The basic image DB 220 stores first through eighth basic images.

The first basic image IM1 is a meter image for the case where the first and second measured values are both their minimums. That is to say, the first basic image IM1 is an image of the dial 301 only, without including a bar graph.

The second basic image IM2 is a meter image for the case where the first measured value is its maximum and the second measured value is its minimum. That is to say, the second basic image IM2 is a meter image in which the second bar graph is not included and only the first bar graph 302 for the case where the maximum first measured value exists on the dial 301. As described above, gradation is applied to the first bar graph 302 such that the larger the value is (i.e. the closer the value comes to the upper end of the dial 301), the paler the color is.

The third basic image IM 3 is a meter image for the case where the first measured value is its minimum and the second measured value is its maximum. That is to say, the third basic image IM3 is a meter image in which the first bar graph 302 is not included and only the second bar graph 304 for the case where the maximum second measured value exists on the dial 301.

The fourth basic image IM4 is a meter image for the case where the first and second measured values are both their maximums. That is to say, the fourth basic image IM4 is a meter image in which two bar graphs 302 and 304 for the case of the maximum first and second measured values exist on the dial 301.

As described above, each of the first through fourth basic images is a basic image that can show the first and second measured values.

The fifth through eighth basic images IM5-IM8 are each an image for decorating the end (bar top) of a bar graph. As shown in FIG. 7, there is the case where the end of the first bar graph 302 covers the second bar graph 304 and the other case, according to the magnitude relation between the two measured values (See the meter A and the meter B, respectively). Thus, to render the bar tops beautifully, bar top images are prepared for each case. The fifth basic image IM5 and the eighth basic image IM8 are images of the bar tops 303 and 305 of the first and second bar graphs, which are used in the case where "the first measured value>the second measured value" (the meter A). On the other hand, the sixth basic image IM6 and the seventh basic image IM7 are images of the bar tops 303 and 305 of the first and second bar graphs, which are used in the case where "the first measure value<=the second measured value" (the meter B). A slightly-under portion of each bar top is shaded for the purpose of decoration. Such a shaded portion is a transmissive color for which a prescribed transmission factor is designated so that the background can be seen.

The first through eighth basic images (IM1-IM8) stored in the basic image DB 220 are opaque images except for the above-mentioned shaded portions. Further, respective priorities are assigned to the first through eighth basic images (IM1-IM8), and this information is stored in the storage unit 130. When basic images are to be overlapped, a basic image of relatively higher priority is displayed. In the present embodiment, the eighth basic image (IM8) has the highest priority, and a basic image of the second-highest priority is the seventh basic image (IM7). Then, the priority becomes lower in the order of the sixth basic image (IM6), the fifth basic image (IM5), the first basic image (IM1), the second basic image (IM2), the third basic image (IM3) and the fourth basic image (IM4). That is to say, the fourth basic image (IM4) becomes the bottom background. In the case where some area of a basic image is transparent (i.e. its opacity is 0%), another basic image of lower priority is exposed.

Returning to FIG. 1, description will be continued. The operation unit 110 is a central unit that performs various kinds of processing. The operation unit 110 is implemented by a computer system that comprises: a Central Processing Unit (CPU) for executing various kinds of processing such as numeric operation and control of various devices; a memory for storing programs, data and the like read from the storage unit 130; and an interface for sending and receiving information to and from the outside.

The operation unit 110 comprises, as its functional components, a main control unit 111, a meter type setting unit 112, an image synthesizing unit 114, a measured value acquisition unit 113, and a display processing unit 116.

The main control unit 111 controls the functional units. For example, when a meter display request is received through the input unit 120, the main control unit 111 instructs the meter type setting unit 112 to set meters to be displayed.

According to the instruction from the main control unit 111, the meter type setting unit 112 performs processing to set types of meters to be displayed. In detail, the meter type setting unit 112 sets, as the meters to be displayed, the types of meters indicated by the main control unit 111, and instructs the image synthesizing unit 114 to generate and display those meter images. Further, by referring to the meter attribute information 210, the meter type setting unit 112 specifies the measured values to be used for the meters to be displayed, and notifies the measured value acquisition unit 113 of those measured values as the measured values to be acquired.

The measured value acquisition unit 113 acquires various kinds of information from the vehicle on which the in-vehicle device 100 is mounted, through a communication medium such as Controller Area Network (CAN). In detail, the measured value acquisition unit 113 acquires measured values (sensor values or calculated values) for the meters to be displayed, which have been set in the meter type setting unit 112. For example, the measured value acquisition unit 113 periodically acquires an efficiency threshold, regenerative power and the like from a control unit of a lithium secondary battery.

The image synthesizing unit 114 generates a meter image 300. In detail, the image synthesizing unit 114 acquires information on the meters to be displayed from the meter attribute information 210, and acquires the measured values to be displayed 211, the bar graphs 212, and their names 213. Further, the image synthesizing unit 114 acquires the minimum and maximum values of the scale range from the scale range information 214. Further, the image synthesizing unit 114 acquires the measured values used for displaying from the measured value acquisition unit 113. Further, the image synthesizing unit 114 acquires (selects) the necessary basic images from the basic image DB 220 depending on the measured values, and processes and synthesizes those basic images to generate a meter image 300, which is displayed on the display unit 140 through the display processing unit 116.

The display processing unit 116 performs processing of displaying on the display unit 140 the meter image 300 generated by the image synthesizing unit 114.

These functional units are implemented when the CPU executes prescribed programs previously stored in the memory or the storage unit 130.

The above-described components are classified according to main contents of their processing, for easy understanding of the configuration of the in-vehicle device 100. Thus, the way of classifying the components and their names do not limit the present invention. The configuration of the in-vehicle device 100 can be further classified into more detailed components depending on contents of their processing. Or, it is possible to make a classification such that a component performs more kinds of processing.

Further, each functional unit of the operation unit 110 may be implemented by hardware (such as an ASIC). Further, one kind of each functional unit may be performed by one unit of hardware or units of hardware.

Next, meter image display processing in the in-vehicle device of the above configuration will be described.

Figure 4:
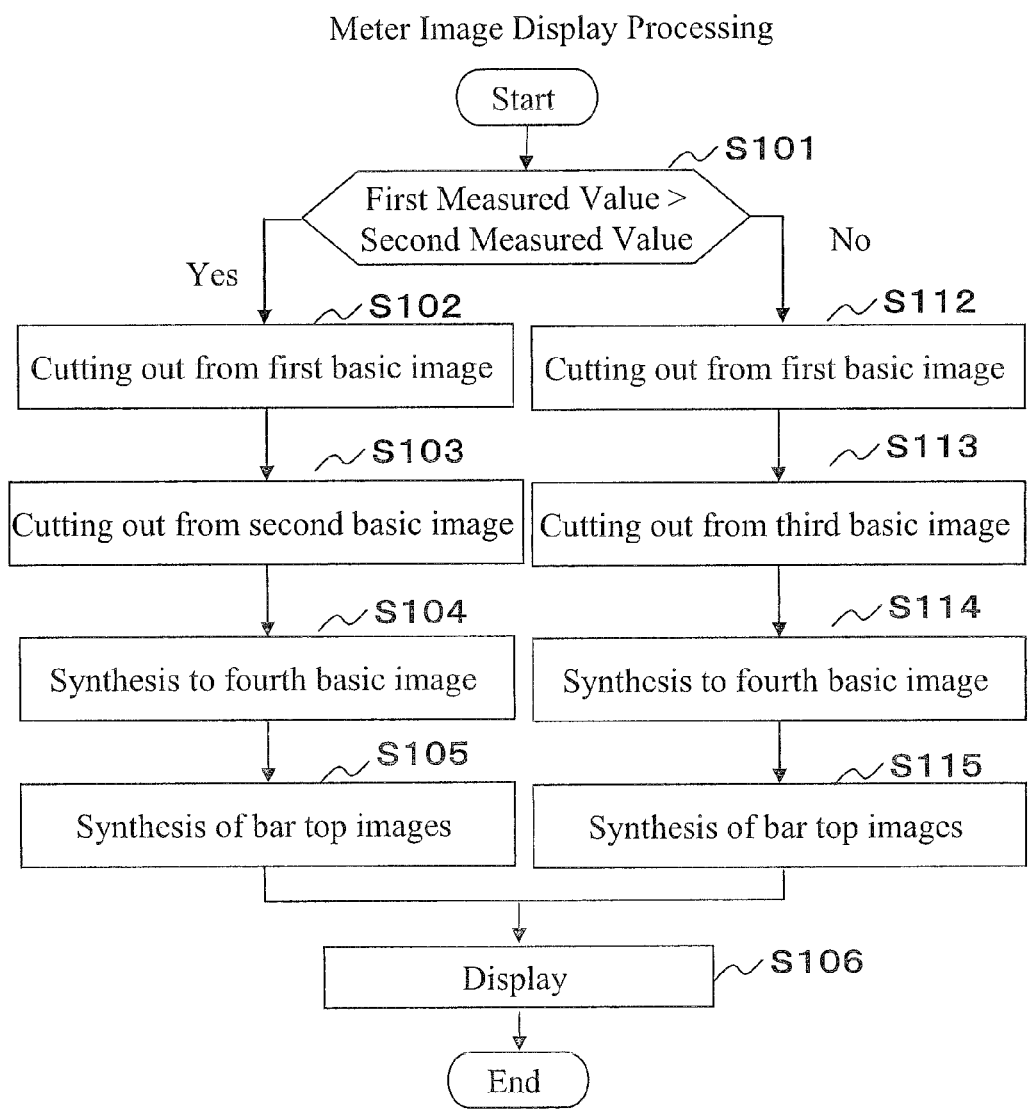
FIG. 4 is a flowchart showing meter image generation processing.
Figure 5:
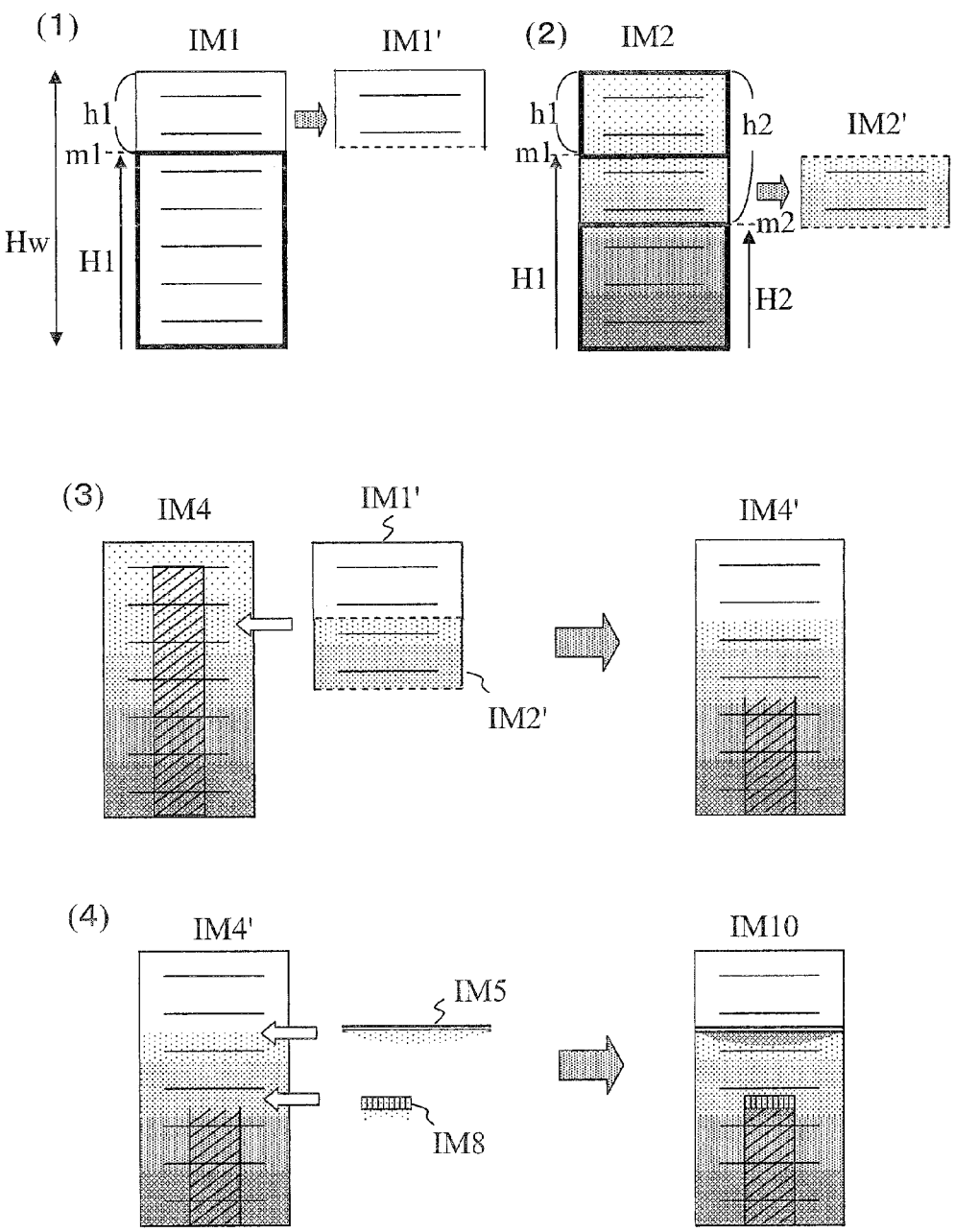
FIG. 5 is a diagram for explaining the meter image generation processing.
Figure 6:
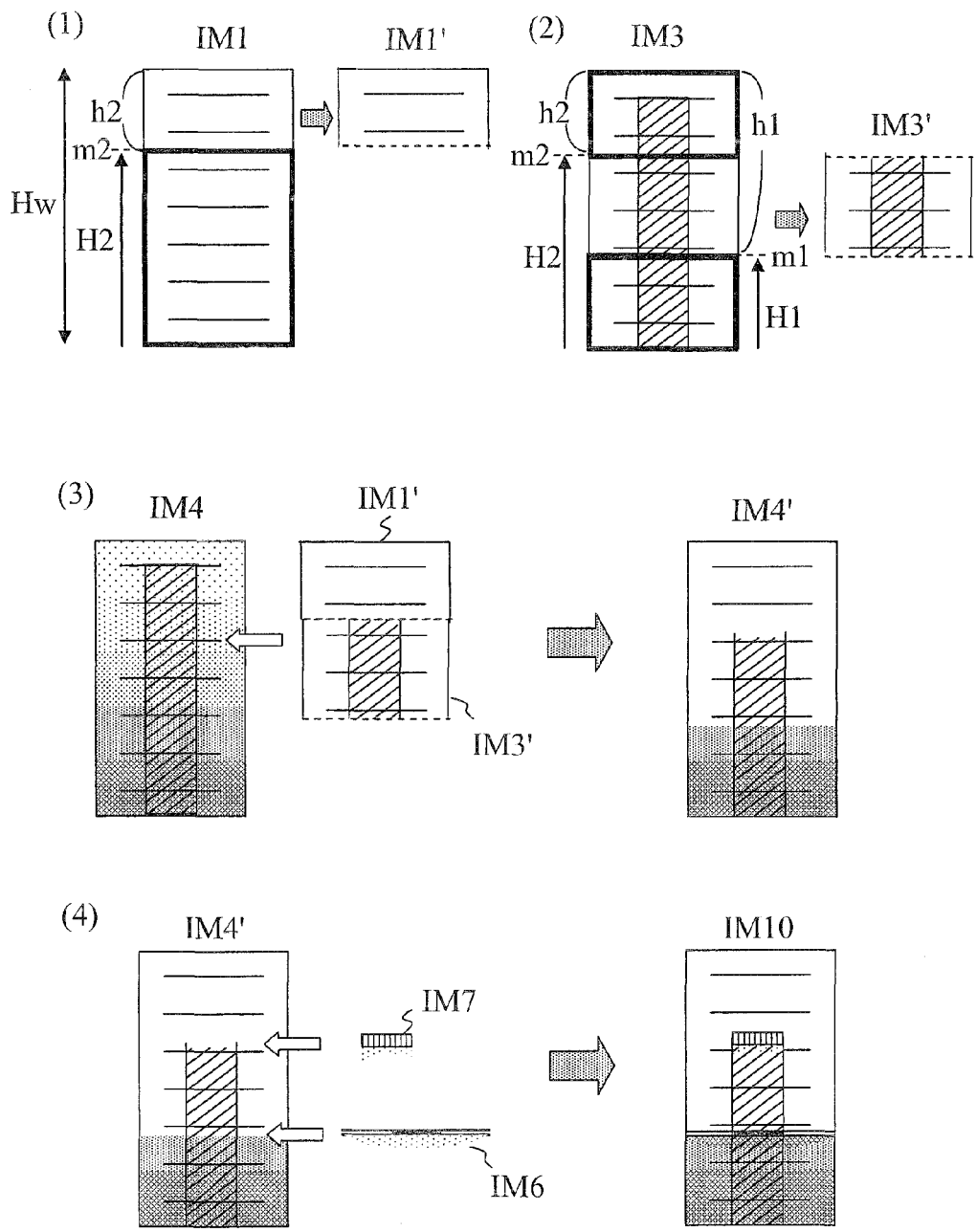
FIG. 6 is a diagram for explaining the meter image generation processing.

FIG. 4 is a flowchart showing meter image display processing. And, FIGS. 5 and 6 are diagrams for explaining processing in this flow.

The flow is started by the image synthesizing unit 114 each time an updated measured value is received.

In the following processing, the image synthesizing unit 114 performs the processing by converting measured values into positions on the dial 301 according to the following equations if necessary (See FIGS. 5 and 6).

$$H1=(m1-\text{Min})/(\text{Max}-\text{Min})*Hw$$

$$H2=(m2-\text{Min})/(\text{Max}-\text{Min})*Hw$$

H1, H2: positions (from the lowest end) in the meter image corresponding to measured values m1 and m2

Hw: longitudinal length of the meter image

Max: the maximum value in the dial

Min: the minimum value in the dial

First, the image synthesizing unit 114 compares the received first measured value (efficiency threshold) with the received second measured value (regenerative power) (S101).

And, in the case of "the first measured value>the second measured value" (Y in S101), the image synthesizing unit 114 performs the processing of the following steps S102-S105.

In the step S102, the image synthesizing unit 114 reads the first basic image IM1 from the basic image DB 220, and generates a first partial image IM1'. In detail, as shown in FIG. 5(1), the image synthesizing unit 114 determines, in the first basic image IM1, the area (hereinafter, sometimes referred to as "unnecessary area") other than the area corresponding to values larger than or equal to the first measured value m1, and sets the opacity of that unnecessary area to 0% so that the area in question is made transmissive. As a result, the image IM1' of the part corresponding to the values larger than or equal to the first measured value remains opaque.

Expressing this by using an image coordinate in which a coordinate value increases in the top-to-bottom direction, the image synthesizing unit 114 keeps the image in the range of the distance h1 (=Hw−H1) from the upper end opaque, and makes the other area transmissive.

In the step S103, the image synthesizing unit 114 reads the second basic image IM2 from the basic image DB 220, and generates a second partial image IM2'. In detail, as shown in FIG. 5(2), the image synthesizing unit 114 determines, as an unnecessary area, the area corresponding to values smaller than or equal to the second measured value m2 in the second basic image IM2, and determines, also as an unnecessary area, the area corresponding to values larger than the first measured value m1. Then, the image synthesizing unit 114 sets the opacity of these unnecessary areas to 0% so that the areas in question are made transmissive. As a result, the image IM2' of the part corresponding to the values larger than the second measured value m2 and smaller than or equal to the first measured value m1 is remain opaque.

Expressing this by using an image coordinate in which a coordinate value increases in the top-to-bottom direction, the image synthesizing unit 114 keeps opaque the image in the range of more than or equal to h1 (=Hw−H1) and less than h2 (=Hw−H2) from the upper end of the second basic image IM2, and makes the other area transmissive.

In the step S104, as shown in FIG. 5(3), the image synthesizing unit 114 reads the fourth basic image IM4 from the basic image DB 220, and combines and synthesizes the fourth basic image IM4, the first partial image IM1' and the second partial image IM2', to generate a combined image IM4'.

The image synthesizing unit 114 is comprised of a CPU, a graphics chip having rendering functions, and a VRAM for temporarily storing a plurality of frames. Thus, the image synthesizing unit 114 renders the combined image IM4' as one frame in the VRAM through the graphics chip under control of the CPU.

Here, as described above, each basic image has its priority prescribed for the case of overlapping. And, in the case where a plurality of basic images are to be overlapped, a basic image of higher priority is displayed. Thus, as for the basic image IM2, it is possible that only the area corresponding to the values smaller than or equal to the second measured value m2 is made transparent to generate the second partial image IM2', without performing the processing in which the area corresponding to the values larger than the first measured value m1 is identified as an unnecessary area and the area in question is made transparent.

In the step S105, as shown in FIG. 5(4), the image synthesizing unit 114 combines and synthesizes the combined image IM4' and the fifth basic image IM5 and the eighth basic image IM8, to generate a meter image IM10 in the same frame. Here, the image synthesizing unit 114 overlaps the fifth basic image IM5 as the top image for the first bar graph at the position corresponding to the first measured value. Further, the image synthesizing unit 114 overlaps the eighth basic image IM8 as the top image for the second bar graph at the position corresponding to the second measured value. Then, the flow proceeds to the step S106.

On the other hand, in the case where "the first measured value>the second measured value" is not satisfied (N in S101), the image synthesizing unit 114 performs the processing of the following steps S112-S115.

In the step S112, the image synthesizing unit 114 reads the first basic image IM1 from the basic image DB 220, and generates a first partial image IM1'. In detail, as shown in FIG. 6(1), the image synthesizing unit 114 determines, in the first basic image IM1, the area (unnecessary area) other than the area corresponding to values larger than or equal to the second measured value m2, and sets the opacity of that unnecessary area to 0% so that the area in question is made transmissive. As a result, the image IM1' of the part corresponding to the values larger than or equal to the second measured value remains opaque.

Expressing this by using the image coordinate in which a coordinate value increases in the top-to-bottom direction, the image synthesizing unit 114 keeps the image in the range of the distance h2 (=Hw−H2) from the upper end opaque, and makes the other area transmissive.

In the step S113, the image synthesizing unit 114 reads the third basic image IM3 from the basic image DB 220, and generates a third partial image IM3'. In detail, as shown in FIG. 6(2), the image synthesizing unit 114 determines, as an unnecessary area, the area corresponding to values smaller than or equal to the first measured value m1 in the third basic image IM3, and determines, also as an unnecessary area, the area corresponding to values larger than the second measured value m2. Then, the image synthesizing unit 114 sets the opacity of these unnecessary areas to 0% so that the areas in question are made transmissive. As a result, the image IM3' of the part corresponding to the values larger than the first measured value m1 and smaller than or equal to the second measured value m2 remains opaque.

Expressing this by using the image coordinate in which a coordinate value increases in the top-to-bottom direction, the image synthesizing unit 114 keeps opaque the image in the range of more than or equal to h2 (=Hw−H2) and less than h1 (=Hw−H1) from the upper end of the second basic image IM2, and makes the other area transmissive.

In the step S114, as shown in FIG. 6(3), the image synthesizing unit 114 reads the fourth basic image from the basic image DB 220, and combines and synthesizes the fourth basic image IM4, the first partial image IM1' and the second partial image IM2' to generate a combined image IM4'.

As described above, the image synthesizing unit 114 is comprised of the CPU, the graphics chip having rendering functions, and the VRAM for temporarily storing a plurality of frames, and renders the combined image IM4' as one frame in the VRAM through the graphics chip under control of the CPU.

Further as described above, each basic image has its priority prescribed for the case of overlapping. And, in the case where a plurality of basic images are to be overlapped, a basic image of higher priority is displayed. Thus, as for the basic image IM3, it is possible that the area corresponding to the values larger than the second measured value m2 is determined as an unnecessary area and processing of making this unnecessary area transparent is not performed, and only the area corresponding to the value smaller than or equal to the first measured value m1 is made transparent to generate a third partial image IM3'.

In the step S115, as shown in FIG. 6(4), the image synthesizing unit 114 combines and synthesizes the combined image IM4', the sixth basic image IM6 and the seventh basic image IM7, to generate a meter image IM10 in the same frame. Here, the image synthesizing unit 114 overlaps the sixth basic image IM6 as the top image for the first bar graph at the position corresponding to the first measured value. Further, the image synthesizing unit 114 overlaps the seventh basic image IM7 as the top image for the second bar graph at the position corresponding to the second measured value. Then, the flow proceeds to the step S106.

In the step S106, the image synthesizing unit 114 displays the meter image IM10 generated in S105 or S115 on the display unit 140 through the display processing unit 116.

Hereinabove, the processing of displaying the meter image has been described. When the above-described flow is finished, the image synthesizing unit 114 awaits the next time of updating the measured values. When updated measured values are received from the measured value acquisition unit 113, the image synthesizing unit 114 starts the flow again to update the meter image. Accordingly, the measured values are displayed as the meter image in real time.

FIG. 7 shows an example of a screen 145 of the display unit 140.

The in-vehicle device 100 can display a plurality of meter images 300 (a meter A, a meter B and a meter C) based on kinds of measured values.

Hereinabove, one embodiment of the present invention has been described.

According to the present embodiment, a complex meter image such as one decorated by gradation can be realized by simply clipping and combining basic images depending on measured values, and thus the processing load can be reduced.

In detail, the basic image DB 220 stores one basic image (for example, the first basic image IM1) that can show the first and second measured values and other basic images (for example the second and fourth basic images IM2, IM4) that can show the first and second measured values and are different from that one basic image. And, based on the first and second measured values acquired by the measured value acquisition unit 113, the image synthesizing unit 114 makes some area of the above-mentioned one basic image transparent and synthesizes the transparent area and the above-mentioned other basic images, to generate an image for display use (for example, the combined image IM4'). As a result, even in the case where a semi-transparent bar graph is used for informing the user of a measured value, it is not necessary to store an image of a semi-transparent bar graph itself, and thus it is possible to inform the user of different kinds of measured values by an easily-understandable nice-looking image while suppressing the load of rendering processing.

Generally, an image that can be semi-transmissive is relatively large in its data amount. As a result, rendering of a semi-transmissive gradation image in a VRAM and further rendering of an image of the background in the VRAM make burdens on rendering processing heavier. On the other hand, in the present embodiment, images in which semi-transparent gradation has been applied against the background are prepared in advance as basic images, and correspondingly their data sizes are smaller. As a result, it is expected that the processing load of rendering each basic image in the VRAM is reduced.

This is not limited to the case where decoration of semi-transmissive gradation or a bar graph is depicted against the background, and can be applied also to the case where a semi-transparent uniformly-colored bar graph is displayed against the background and the case where a semi-transparent gradation bar graph and a semi-transparent uniformly-colored bar graph are displayed against the background.

The present invention is not limited to the above-described embodiment.

For example, the order of the processing steps shown in the flow of FIG. 4 may be changed freely as far as the meter image is generated in the end. For example, the steps S102 and S103 may be performed in reverse order. And, the steps S112 and S113 may be performed in reverse order.

Further, in the above embodiment, the flow branches to the processing of the steps S102-S105 or to the processing in the steps S112-S115 depending on the judgment in the step S101. However, an embodiment of the present invention is not limited to this. For example, processes of (1) generation of a first partial image IM1', (2) generation of a second partial image IM2' or a third partial image IM3', (3) generation of a combined image IM4' and (4) generation of a meter image, which are described in detail in the following, may be performed in this order.

(1) Generation of a First Partial Image IM1'

On starting this flow, the image synthesizing unit 114 first acquires the first basic image IM1 from the basic image DB 220. Then, the image synthesizing unit 114 determines a larger value between two measured values from the first basic image IM1, and acquires an image of an area corresponding to values larger than the identified value (i.e. makes an unnecessary area transmissive), to define the resultant image as a first partial image IM1'.

(2) Generation of a Second or Third Partial Image IM2', IM3'

Further, when the first measured value is larger than the second measured value, the image synthesizing unit 114 acquires the second basic image IM2 from the basic image DB 220, and acquires the image of the area corresponding to the values between the first and second measured values (i.e. makes the unnecessary areas transmissive), to define the resultant image as a second partial image IM2'. On the other hand, when the second measured value is larger than the first measured value, the image synthesizing unit 114 acquires the third basic image IM3 from the basic image DB 220, and acquires the image of the area corresponding to the values between the first and second measured values (i.e. makes the unnecessary areas transmissive), to define the resultant image as a third partial image IM3'.

(3) Generation of a Combined Image IM4'

The image synthesizing unit 114 acquires the fourth basic image IM4 from the basic image DB 220. Then, the image synthesizing unit 114 overlaps the fourth basic image IM4, the first partial image IM1', and the second partial image IM2' or the third partial image IM3' generated in the above process (2), to generate a combined image IM4'.

(4) Generation of a Meter Image

In the case of "the first measured value>the second measured value", the image synthesizing unit 114 combines the combined image IM4', the fifth basic image IM5 and the eighth basic image IM8, to obtain a combined meter image IM10. On the other hand, in the case where "the first measured value>the second measured value" is not satisfied, the image synthesizing unit 114 combines and synthesizes the combined image IM4', the sixth basic image IM6 and the seventh basic image IM7, to generate a meter image IM10.

According to the above-described processes (1)-(4), the in-vehicle device 100 can generate and display the same meter image 300 as that generated according to the processing in the order shown in FIG. 4.

Further, considering the possibility that the measured values return to the same values in a short time, the image synthesizing unit 114 may keep a generated meter image in the storage unit 130. When the measured values are received from the measured value acquisition unit 113, it is judged whether there is a stored meter image for measured values that are coincident with the received measured values (all the values in the case of a plurality of values). If there is such a stored meter image, then that stored meter image is read and used for displaying, without generating a new image. However, to reduce consumption of the storage capacity, it is possible to delete stored meter images in the order of oldest generation times or after an elapse of a prescribed time from the generation time, when the volume of the stored meter images exceeds a prescribed capacity.

The in-vehicle device of the present invention can be applied to various devices for vehicle use. For example, the in-vehicle device of the present invention may be constructed integrally with a vehicle navigation system.

SYMBOLS

100 . . . in-vehicle device; 110 . . . operation unit; 120 . . . input unit; 130 . . . storage unit; 140 . . . display unit; 111 . . . main control unit; 112 . . . meter type setting unit; 113 . . . measured value acquisition unit; 114 . . . image synthesizing unit; 116 . . . display processing unit; 210 . . . meter attribute information; 220 . . . basic image DB

The invention claimed is:

1. An in-vehicle device comprising:
a measured value acquisition unit, which acquires measured values that vary depending on conditions of a vehicle as first and second measured values;
an image storage unit, which stores kinds of basic images;
an image generation unit, which generates an image for display use by synthesizing at least two of the kinds of basic images stored in the image storage unit to represent the first and second measured values acquired by the measured value acquisition unit, and generates the image for display use by transparentizing some areas corresponding to the acquired first and second measured values of at least one of the given basic images among the kinds of basic images, and thereby overlapping the transparentized areas on an image other than the given basic image; and
an image display unit, which displays the image for display use generated by the image generation unit,
wherein:
the image storage unit stores:
a first basic image showing the case where the first and second measured values are both the minimum values;
a second basic image showing the case where the first measured value is the minimum value and the second measured value is the maximum value;
a third basic image showing a case where the first measured value is the maximum value and the second measured value is the minimum value; and
a fourth basic image showing the case where the first and second measured values are both the maximum values; and
the image generation unit uses:
the first, third and fourth basic images for creating the image for display use, when the first measured value is larger than the second measured value; and
the first, second and fourth basic images for creating the image for display use, when the first measured value is not larger than the second measured value.

2. The in-vehicle device of claim 1, wherein:
the image generation unit:
transparentizes some parts of the first, third and fourth basic images so that an area corresponding to values larger than the first measured value in the first basic image, an area corresponding to values between the first measured value and the second measured value in the third basic image and an area corresponding to values smaller than the second measured value in the fourth basic image appear in the image for display use, when the first measured value is larger than the second measured value; and
transparentizes some parts of the first, second and fourth basic images so that an area corresponding to values larger than the first measured value in the first basic image, an area corresponding to values between the first measured value and the second measured value in the second basic image and an area corresponding to values smaller than the second measured value in the fourth basic image appear in the image for display use, when the first measured value is not larger than the second measured value.

3. The in-vehicle device of claim 1, wherein:
the basic images are images to which gradation is applied, images displaying a bar graph of a uniform color, or images including an image to which gradation is applied and a bar graph of a uniform color.

4. The in-vehicle device of claim 1, wherein the image generation unit generates an image for display use every time measured values are acquired by the measured value acquisition unit.

5. An in-vehicle device comprising:
a measured value acquisition unit, which acquires measured values that vary depending on conditions of a vehicle as first and second measured values;
an image storage unit, which stores kinds of basic images;
an image generation unit, which generates an image for display use by synthesizing at least two of the kinds of basic images stored in the image storage unit to represent the first and second measured values acquired by the measured value acquisition unit, and generates the image for display use by transparentizing some areas corresponding to the acquired first and second measured values of at least one of the given basic images among the kinds of basic images, and thereby overlapping the transparentized areas on an image other than the given basic image; and
an image display unit, which displays the image for display use generated by the image generation unit,
wherein:
the image storage unit stores, as given basic images:
a first basic image showing the case where the first and second measured values are both the minimum values;
a second basic image showing the case where the first measured value is the maximum value and the second measured value is the minimum value;
a third basic image showing a case where the first measured value is the minimum value and the second measured value is the maximum value; and
the image generation unit uses the first basic image and the second or third basic images for synthesizing the images.

6. The in-vehicle device of claim 5, wherein:
the basic images have the same size and form; and
the image generation unit transparentizes a first area as a part of the first basic image, and transparentizes a second area as an area other than the first area of the second and third basic images.

* * * * *